(12) United States Patent
Laborde, Jr.

(10) Patent No.: US 10,882,458 B2
(45) Date of Patent: Jan. 5, 2021

(54) APPARATUS FOR TEMPORARILY STORING SHOTGUNS AND RIFLES IN FIELD ENVIRONMENT

(71) Applicant: Ruben Laborde, Jr., San Antonio, TX (US)

(72) Inventor: Ruben Laborde, Jr., San Antonio, TX (US)

( * ) Notice: Subject to any disclaimer, the term of this patent is extended or adjusted under 35 U.S.C. 154(b) by 0 days.

(21) Appl. No.: 16/297,524

(22) Filed: Mar. 8, 2019

(65) Prior Publication Data

US 2019/0275950 A1   Sep. 12, 2019

Related U.S. Application Data

(60) Provisional application No. 62/641,254, filed on Mar. 9, 2018.

(51) Int. Cl.
*B60R 9/02* (2006.01)
*F41C 33/00* (2006.01)
*B60R 7/14* (2006.01)

(52) U.S. Cl.
CPC ............... *B60R 9/02* (2013.01); *B60R 7/14* (2013.01); *F41C 33/005* (2013.01)

(58) Field of Classification Search
CPC ..... B60R 9/02; B60R 7/00; B60R 7/14; F41C 33/005; A47B 81/005; F41A 23/18
See application file for complete search history.

(56) References Cited

U.S. PATENT DOCUMENTS

| | | | | |
|---|---|---|---|---|
| 582,086 A | * | 5/1897 | Poole et al. | B62H 3/00 211/22 |
| 908,320 A | * | 12/1908 | Page | A47G 25/10 248/304 |
| 1,140,730 A | * | 5/1915 | Wolfert | B60N 2/286 297/256 |
| 1,280,362 A | * | 10/1918 | Alveson et al. | B60R 9/02 224/42.32 |
| 3,477,586 A | * | 11/1969 | Haluska | A47B 81/005 211/64 |
| 3,746,177 A | * | 7/1973 | Vilotti | F41A 23/18 211/64 |
| 3,876,078 A | * | 4/1975 | Gomes | A47B 81/005 211/64 |
| 4,132,315 A | * | 1/1979 | Young | E05B 73/00 211/4 |
| 4,144,971 A | * | 3/1979 | Balibrea | F41A 23/18 211/64 |

(Continued)

*Primary Examiner* — Ko H Chan
(74) *Attorney, Agent, or Firm* — Shah IP Law, PLLC; Samar Shah

(57) ABSTRACT

An apparatus for safely storing guns in a field environment is disclosed herein. The apparatus is comprised of a recoil rest pad for receiving and supporting a gun's recoil pad and ensuring that it does not become damaged, a barrel support pad for securing the barrel of the gun within an interior diameter that is larger than the diameter of the barrel, and an opening that can be stretched, but wherein the opening—in its unstretched state—is less wide than the diameter of the barrel, and an attachment mechanism for attaching the apparatus to a vehicle. Moreover, the various elements of the invention are connected by a fabric-type element, which makes the apparatus lightweight, and easy to pack-up and stow when not in use.

15 Claims, 6 Drawing Sheets

(56) References Cited

U.S. PATENT DOCUMENTS

| | | | | |
|---|---|---|---|---|
| 5,495,969 | A * | 3/1996 | Cardenas | B60R 7/14 224/275 |
| 5,626,379 | A * | 5/1997 | Scott | A47B 81/005 211/195 |
| 6,405,909 | B1 * | 6/2002 | Burnett | B60R 7/043 211/64 |
| 6,412,675 | B1 * | 7/2002 | Pope | B60R 9/02 224/325 |
| D622,086 | S * | 8/2010 | Leung | D6/552 |
| 7,954,654 | B1 * | 6/2011 | Hoyt | F41B 5/14 211/60.1 |
| 8,403,278 | B1 * | 3/2013 | Kasbohm | F41C 33/06 211/64 |
| 8,640,875 | B2 * | 2/2014 | Garfinkle | A47F 3/14 206/557 |
| 9,194,655 | B1 * | 11/2015 | Cha | A45F 3/14 |
| 9,239,130 | B1 * | 1/2016 | Smiley | B25H 3/006 |
| 9,616,818 | B1 * | 4/2017 | Zambrano | B60R 11/06 |
| 10,144,358 | B2 * | 12/2018 | Fife | B60R 7/14 |
| 2006/0213942 | A1 * | 9/2006 | Gomez | B60R 9/00 224/532 |
| 2008/0087785 | A1 * | 4/2008 | Roche | A47B 96/02 248/309.4 |
| 2014/0182448 | A1 * | 7/2014 | Jantzen | E04H 15/04 89/36.01 |

\* cited by examiner

APPARATUS FOR TEMPORARILY STORING SHOTGUNS AND RIFLES IN FIELD ENVIRONMENT

CROSS-REFERENCE TO RELATED APPLICATIONS

This application claims priority to U.S. Provisional Patent Application Ser. No. 62/641,254, filed Mar. 9, 2018, entitled "Apparatus for Temporarily Storing Shotguns and Rifles in a Field Environment." The entire content of that application is incorporated herein by reference.

BACKGROUND

Field of the Art

This disclosure relates to an apparatus for storing shotguns, rifles, and other long barreled objects in a field environment.

Discussion of the State of the Art

Systems and methods for safely stowing a shotgun or a rifle (herein also referred to more generically as a "gun") in a field environment are limited. Often, there are no mechanisms available for safely securing a gun during the time that hunters and/or marksmen get in and out of hunting gear or other specialized equipment.

Typically, hunters and marksmen rest their guns against a tree or a vehicle before and after their activity. But this approach is often unsafe because there is some likelihood that the gun may slide down and accidentally discharge. Moreover, the gun may also become damaged or dirty by resting against abrasive materials, or due to falling on an abrasive surface. This is a big concern for those who are using unique, antique, or otherwise expensive guns that are difficult to repair or restore.

The current mechanisms for stowing guns are cumbersome. They typically require the users to take the gun apart and stow its various pieces separately in a storage case. Thus, these storage mechanisms are impractical to use whenever the user needs to have access to his or her gun quickly and effortlessly. Gun racks are equally as difficult to use in a field environment because they are large, heavy, cumbersome, and are difficult to haul and deploy. Moreover, gun racks typically secure guns in a manner that prevents users from quickly removing guns from the rack and placing them back in with speed and ease.

SUMMARY

The inventor has conceived and reduced to practice an apparatus for safely storing guns in a field environment. In one embodiment of the invention, the apparatus is comprised of a recoil rest pad for receiving and supporting a gun's recoil pad and ensuring that it does not become damaged, a barrel support pad for securing the barrel of the gun within an interior diameter that is larger than the diameter of the barrel, and an opening that can be stretched, but wherein the opening—in its unstretched state—is less wide than the diameter of the barrel, and an attachment mechanism for attaching the apparatus to a vehicle.

A feature of the present invention is that it is easy to stow and deploy in a field environment. More specifically, the present invention is substantially made from a fabric-type material. Thus, it is easy to roll-up or fold-up the apparatus for convenient storage and stowing in a vehicle or other small spaces. Moreover, the inventive apparatus is light weight, especially as compared to traditional gun racks which are made from wood, metal and other heavy materials. As a result, it is easy to carry the inventive apparatus to various field sites and set it up at different locations throughout the course of the day or, for example, as a hunt progresses.

Another feature of the present invention is that is easy to secure it to a variety of different surfaces on an as-needed basis. Traditional, prior art gun racks, can generally only be secured in one space, such as, for example, the interior of a car. However, there are a variety of different vehicle types with different interior spaces. As such, prior art devices are not adaptable for universal use without significant custom install work. Moreover, most prior art devices require a vehicle of some sort to secure a gun rack against. But, as a hunt or an activity progresses, a vehicle may not be readily available, and a gun retention device may have to be secured to other areas and surfaces. Finally, many mobile gun racks require some permanent installation on the user's car, which may be inconvenient when a user does not need to stow or carry guns. In a preferred embodiment, the present invention is comprised of G-clip attachment mechanisms that securely attaches to an interior portion of a pick-up truck's side panel. However, as described below, other attachment mechanisms may be used as well.

Another feature of the present invention is that it permits a user to take one or more guns off the rack, or place one or more guns into the rack quickly and easily. This feature enables the users to quickly deploy their guns if necessary, while at the same time, securing the one or more guns when they are stowed within the apparatus. In one embodiment, the present invention is comprised of a barrel holder that has an opening and an interior chamber. In one embodiment, the opening is less wide than the diameter of the gun barrel, and the interior chamber is wider than the diameter of the gun barrel. In such an embodiment, the opening stretches or temporarily expands to accommodate the gun barrel, but, when it is not being stretched, it securely prevents the gun barrel from falling out.

Another feature of the present invention is that it protects guns from scuffs, dings, and other accidental damage. Generally, in a field environment, guns are typically placed on the ground or against other objects, such as trees, vehicles, etc. As a result, these guns often suffer minor scratches or other superficial paint damage, etc., by making contact with abrasive substances. This type of damage also occurs with many traditional gun racks or holstering systems. And, although the damage may be superficial, minor damage caused by these systems often significantly lowers the value of the guns, especially guns that are unique, antique, or otherwise valuable. The present invention is created from softer surfaces. For example, in one embodiment of the invention, the barrel support pad is made from a foam-type substance that secures the gun barrel.

In one exemplary embodiment, the inventive apparatus is comprised of an attachment mechanism for attaching the apparatus to a stationary object, a barrel support pad comprising an opening and an interior cavity for securing the barrel of a gun, wherein the interior cavity of the barrel support pad is wider in diameter than the exterior diameter of the gun and the opening is narrower than the exterior diameter of the gun, the barrel support pad further being flexible wherein the width of the opening may be expanded by the application of pressure, a recoil pad rest comprising at least one divot for receiving the recoil pad of a rifle or a shotgun, and a resting pad connecting the recoil pad rest to the barrel support pad, wherein the resting pad is comprised of a fabric-type material that can be rolled or folded by a user.

The apparatus may be further comprised of an adjustable support strap for connecting the attachment mechanism to the resting pad, wherein the adjustable support strap may be further comprised of an adjustment mechanism for lengthening or shortening the adjustable support strap. The adjustable support strap may be comprised of a flexible fabric-type material that can be rolled or folded by a user. The apparatus may also be comprised of a safety stake for securing the apparatus to a ground surface.

In one exemplary embodiment of the invention, the attachment mechanism may be comprised of a G-clip for attaching the apparatus to a stationary object. The G-clip may be further comprised of a hook, a vertical brace, and a horizontal brace, wherein the hook lodges over and around a stationary object's overhang. The horizontal and vertical braces secure the G-clip against the stationary object and help redistribute the weight that may be supported by the G-clip, including the weight of the apparatus and the weight of the guns that may be placed within the apparatus. The attachment mechanism may also be comprised of a buckle system for securing the apparatus around a stationary object. For example, a three-prong male and female buckle attachment may be used to secure the apparatus around a tree. Each buckle piece may be attached to a strap, wherein each strap is further connect to the apparatus, and/or more specifically, the resting pad.

In one exemplary embodiment, the barrel support pad of the apparatus may be comprised of a foam-type material, wherein the barrel support pad's opening may be expanded by compressing the foam elements of the barrel support pad. In one embodiment of the invention, the barrel support pad's opening may be tapered to make it easier to insert a barrel through the opening.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1A:
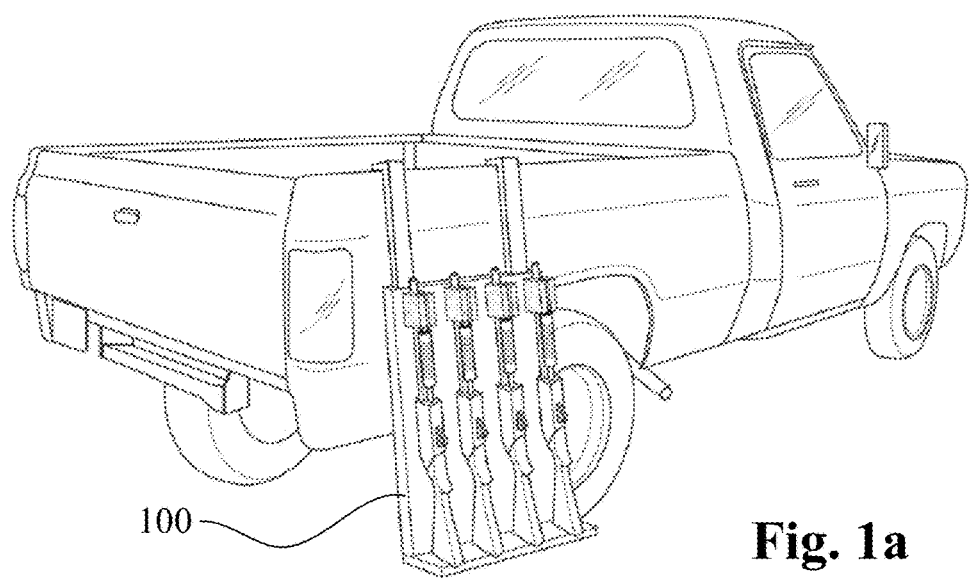
FIG. 1a illustrates an inventive apparatus of the present invention in accordance with an embodiment of the invention.

The inventor has conceived, and reduced to practice, an apparatus that permits users to safely stow their shotguns and rifles when they are not in use, typically, before and after an activity as the users gear up or gear down. The inventive system includes a harness for securing a gun in a manner that ensures that the gun does not accidentally slide out or fall out. Moreover, the inventive system and method includes an attachment mechanism for securing the first harness against a stationary object to ensure that the gun does not become dirty or get exposed to abrasive materials that may damage the gun's paint and/or its resale value.

The inventive apparatus greatly improves the convenience factor associated with stowing a gun in a field environment. For the example, the inventive system permits a user to stow the gun in a manner that allows for insertion and removal, and does not require any disassembly. The inventive system also includes mechanisms for easily collapsing the entire system and stowing it in small spaces. Unlike gun racks, which are large, cumbersome, and difficult to deploy, the inventive system is light weight, readily moveable, and easy to carry.

The inventive apparatus also employs materials that, if they come into contact with a gun, will not damage it. Through these various mechanisms, the inventive apparatus improves a user's experience while also preserving the value and the integrity of guns that are stowed on the apparatus.

The inventive apparatus is also comprised of flexible material that can be folded or rolled-up by a user for convenient carrying and stowing. Moreover, the use of flexible material also significantly reduces the weight of the apparatus, thereby making the apparatus much more light weight and easy to deploy in a field environment.

The invention is described by reference to various elements herein. It should be noted, however, that although the various elements of the inventive apparatus are described separately below, the elements need not necessarily be separate. The various embodiment may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described, it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The inventive apparatus described herein permits users to safely stow their shotguns and rifles when they are not in use, typically, before and after an activity as the users gear up or gear down. The inventive system includes a harness for securing a gun in a manner that ensures that the gun does not accidentally slide out or fall out. Moreover, the inventive system and method includes an attachment mechanism for securing the first harness against a stationary object to ensure that the gun does not become dirty or get exposed to abrasive materials that may damage the gun's paint and/or its resale value.

The inventive system and method also greatly improves the convenience factor associated with stowing a gun in a field environment. For the example, the inventive system permits a user to stow the gun in a manner that allows for easy pick-up and drop-off, and does not require any disassembly. The inventive system also includes mechanisms for easily collapsing the entire system and stowing it in small spaces. Unlike gun racks, which are large, cumbersome, and difficult to deploy, the inventive system is light weight, readily moveable, and easy to carry.

The inventive apparatus also employs materials that, if they come into contact with a gun, will not damage it. Through these various mechanisms, the inventive apparatus improves a user's experience while also preserving the value and the integrity of guns that are stowed on the apparatus.

In accordance with an embodiment of the inventive apparatus for temporarily storing a gun in a field environment for quick insertion and removal is comprised of an attachment mechanism for attaching the apparatus to an exterior portion of a vehicle, a barrel support pad comprising an opening and an interior cavity for securing the barrel of the gun, wherein the interior cavity of the barrel support pad is wider in diameter than the exterior diameter of the gun and the opening is narrower than the exterior diameter of the gun, the barrel support pad further being flexible wherein the width of the opening may be expanded by the application of pressure; and a recoil pad rest comprising at least one divot for receiving the recoil pad of the gun, the recoil pad rest and the barrel support pad securing the gun in substantially vertical orientation such that the recoil pad rest is below the barrel of the gun when the gun is secured within the apparatus; and a resting pad connecting the recoil pad rest to the barrel support pad, wherein the resting pad is comprised of a fabric-type material that can be rolled or folded by a user.

The apparatus may further comprise an adjustable support strap for connecting the attachment mechanism to the resting pad. The adjustable support strap may further comprise an adjustment mechanism for lengthening or shortening the adjustable support strap. The adjustable support strap may also be comprised of a flexible fabric-type material that can be rolled or folded by a user. The apparatus may also comprise a safety stake for securing the apparatus to a ground surface.

In one embodiment of the invention, the attachment mechanism is comprised of a G-clip. The G-clip is comprised of a hook, a vertical brace, and a horizontal brace, wherein the hook lodges over and around a ledge on the vehicle's exterior surface. In one embodiment, the G-clip attaches to a portion of a sidewall surrounding a pick-up truck's truck bed.

In one embodiment, the attachment mechanism is comprised of a buckle system for securing the apparatus around a stationary object.

In one embodiment, the barrel support pad is comprised of a foam-type material. In one embodiment, the barrel support pad's opening may be expanded by thrusting the barrel of the gun towards the interior cavity of barrel support pad when the barrel of the gun is exterior to the barrel support pad. The barrel support pad's opening may be expanded by thrusting the barrel of the gun towards the barrel support pad's opening when the barrel of the gun is inside the barrel support pad. The opening of the barrel support pad prevents the barrel of the gun from entering or exiting the interior cavity unless pressure is applied to force the gun through the barrel support pad's opening. In one embodiment the barrel support pad's opening is tapered to funnel the barrel of the gun towards the barrel support pad's opening.

In one embodiment, the apparatus for temporarily storing a gun in a field environment for quick insertion and removal is comprised of, an attachment mechanism for attaching the apparatus to vertically upright structure, a barrel support pad comprising an opening and an interior cavity for securing the barrel of a rifle or a shotgun, wherein the interior cavity of the barrel support pad is wider in diameter than the exterior diameter of the gun and the opening is narrower than the exterior diameter of the gun, the barrel support pad further being flexible wherein the opening may be expanded by the application of pressure, and a recoil pad rest comprising at least one divot for receiving the recoil pad of a rifle or a shotgun, the recoil pad rest and the barrel support pad securing the gun in substantially vertical orientation such that the recoil pad rest is below the barrel of the gun when the gun is secured within the apparatus; and a resting pad connecting the recoil pad rest to the barrel support pad, wherein the resting pad is comprised of a fabric-type material that can be rolled or folded by a user. Wherein the vertical structure is a tree or a wall. In this configuration, the attachment mechanism is comprised of mating buckles that can be mated around the tree's trunk to secure the apparatus to the tree. In another embodiment, the attachment mechanism is comprised of a wedge mechanism that may be lodged into a portion of the wall.

Apparatus

Figure 1B:
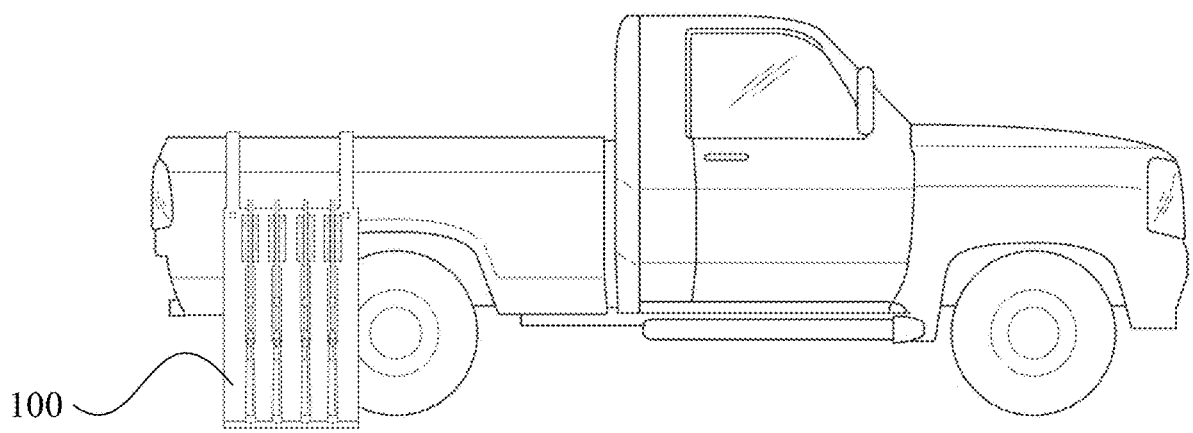
FIG. 1b illustrates an inventive apparatus of the present invention in accordance with an embodiment of the invention.
Figure 1C:
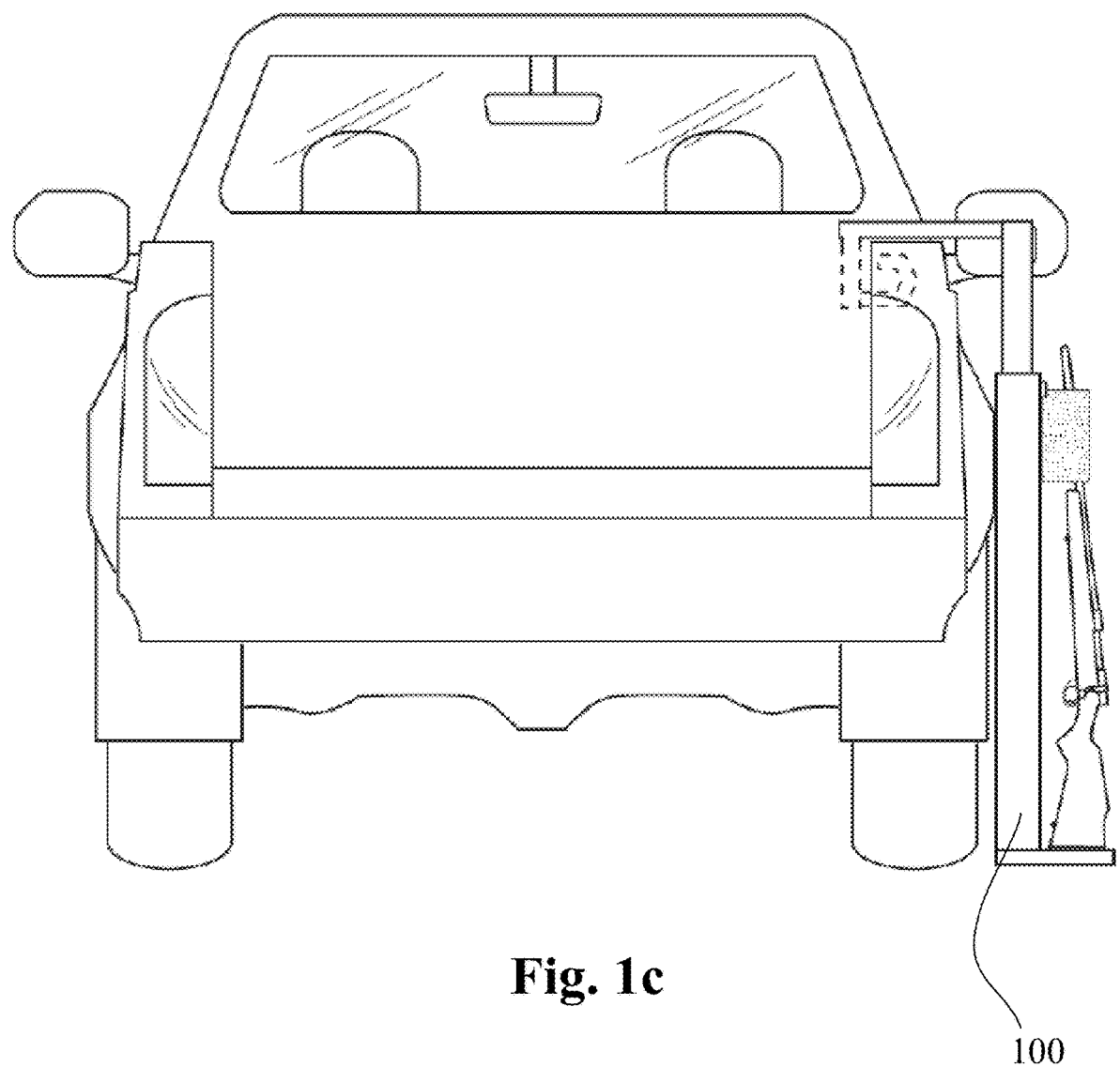
FIG. 1c illustrates an inventive apparatus of the present invention in accordance with an embodiment of the invention.

FIGS. 1a, 1b, and 1c illustrate the inventive apparatus according to one exemplary embodiment. In these particular illustrations, the inventive apparatus is mounted on a truck bed's sidewall. However, as discussed in greater detail below, the inventive apparatus may be mounted on other types of vehicles and other types of objects, such as walls, tree trunks, etc.

FIGS. 1a, 1b, and 1c illustrate an inventive apparatus that is designed to hold four guns. However, as discussed in greater detail below, the inventive apparatus may be designed to hold fewer or greater number of guns Finally, the guns in FIGS. 1a, 1b, and 1c are shown for illustration purposes only. The guns themselves are not claimed in this invention, and various types of guns, including ones that are not illustrated or described herein, may be used with the inventive apparatus as described herein.

Figure 2:
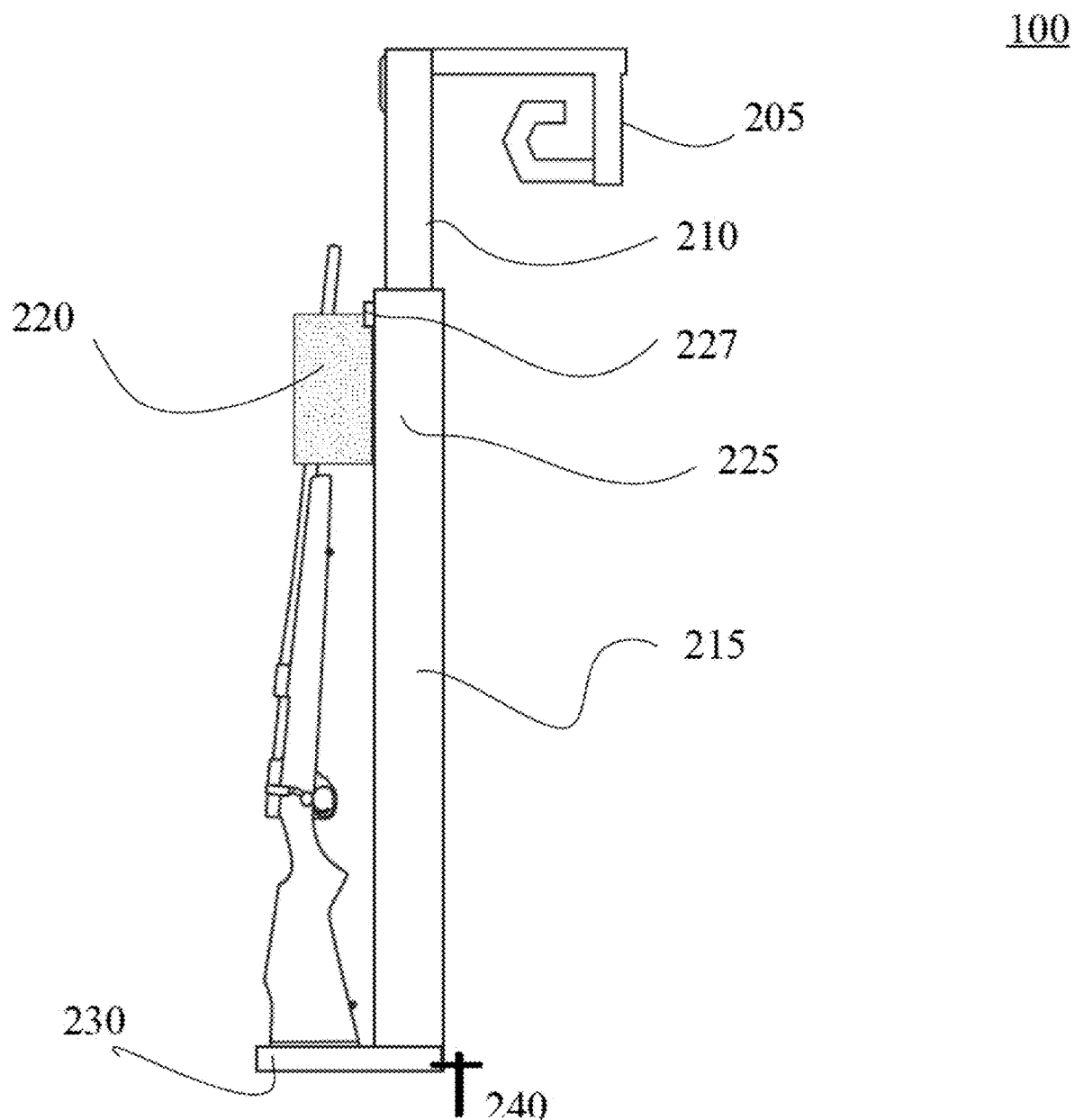
FIG. 2 illustrates, m accordance with an embodiment of the invention, a detailed view of the inventive apparatus.

FIG. 2 illustrates the inventive apparatus 100 in greater detail in accordance with an embodiment of the invention. The apparatus 100 includes an attachment apparatus 205, support straps 210, a resting pad 215, a barrel support pad 220, a support plank 225, rod support 227, recoil pad rest 230, and a safety stake 240.

The apparatus 100 permits users to temporarily stow a gun in a field environment by placing the recoil pad on the recoil pad rest 230, and placing the barrel of the gun in the barrel support pad 220. The entire apparatus 100 may be mounted on a vehicle or some other surface through the attachment apparatus 205, and secured to the ground via a safety stake 240. In this manner, the apparatus 100 may be used to stow a gun in a field environment in a manner that allows the user to have easy in-and-out access to the gun while also protecting the gun against accidental drops and the resulting abrasion or damage.

As would be readily understood by a person of ordinary skill in the art, the elements described in FIG. 2 are for illustration purposes only. The specific elements of the invention may be varied without departing from the scope of the invention. Moreover, additional elements may be added or removed without departing from the scope of the invention, as described and claimed in greater detail below.

Attachment Mechanism

Figure 3:
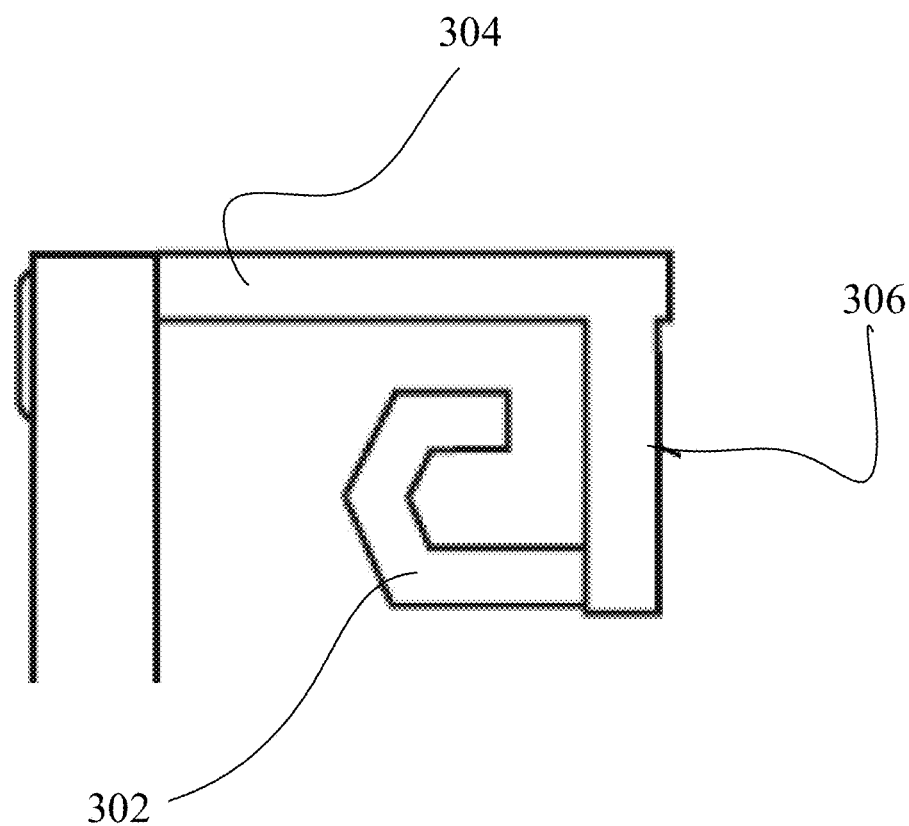
FIG. 3 illustrates a portion of the inventive apparatus, in accordance with an embodiment of the invention.

FIG. 3 illustrates an exemplary attachment mechanism 205 according to one embodiment of the invention. In particular, FIG. 3 illustrates a "G" clip attachment mechanism as displayed from a side view. The "G" clip is an exemplary attachment mechanism that may be used to attach the apparatus 100 to the side of a truck bed's sidewall But, as would be readily understood by a person of ordinary skill in the art, other attachment mechanisms may be used to attach the apparatus 100 to a truck bed's sidewall.

Referring now to FIG. 3, which illustrates the "G" clip 205 in accordance with an embodiment of the invention. The "G" clip 205 may be comprised of a hook 302, a vertical brace 306, and a horizontal brace 308. The various elements of the "G" clip ensure that the attachment mechanism attaches to a vehicle or any other stationary object, and connect to the rest of the apparatus 100 as described in this invention.

The various elements of the "G" clip 205 secure the apparatus 100 to a sidewall surrounding a pick-up truck's flatbed or truck bed. Indeed, the G clip 204, as illustrated in FIG. 3 is specifically designed to mate or attach to a pick-up truck's sidewall. More specifically, the hook 302 wraps around an interior ledge in pick-up trucks' sidewall. The vertical brace 306 and the horizontal brace 304 redistribute the weight of the apparatus and ensure that the hook does not slip-off from the truck's sidewall.

The G clip is one exemplary attachment mechanism 205 as disclosed herein. However, other attachment mechanisms may be used without departing from the scope of the invention. The attachment mechanism 205 may change depending on the structure that the attachment mechanism 205 connects to. For example, if the attachment mechanism 205 attaches to a flat surface such a wall, then nails, cleats, wedges, etc. may be used to post or attach the attachment mechanism 205 to that structure. If the structure includes a roll bar or a rack system, then alligator clips or other circular clips may be used. Other mechanisms, which may be known to a person of ordinary skill in the art, may be used to attach the attachment mechanism 205 these and other structures without departing from the scope of the invention. In one embodiment, quick release buckles may be used as attachment mechanism 205 to wrap the support straps around the diameter of a tree trunk to secure the apparatus 100 to a tree.

Resting Pad

Figure 4:
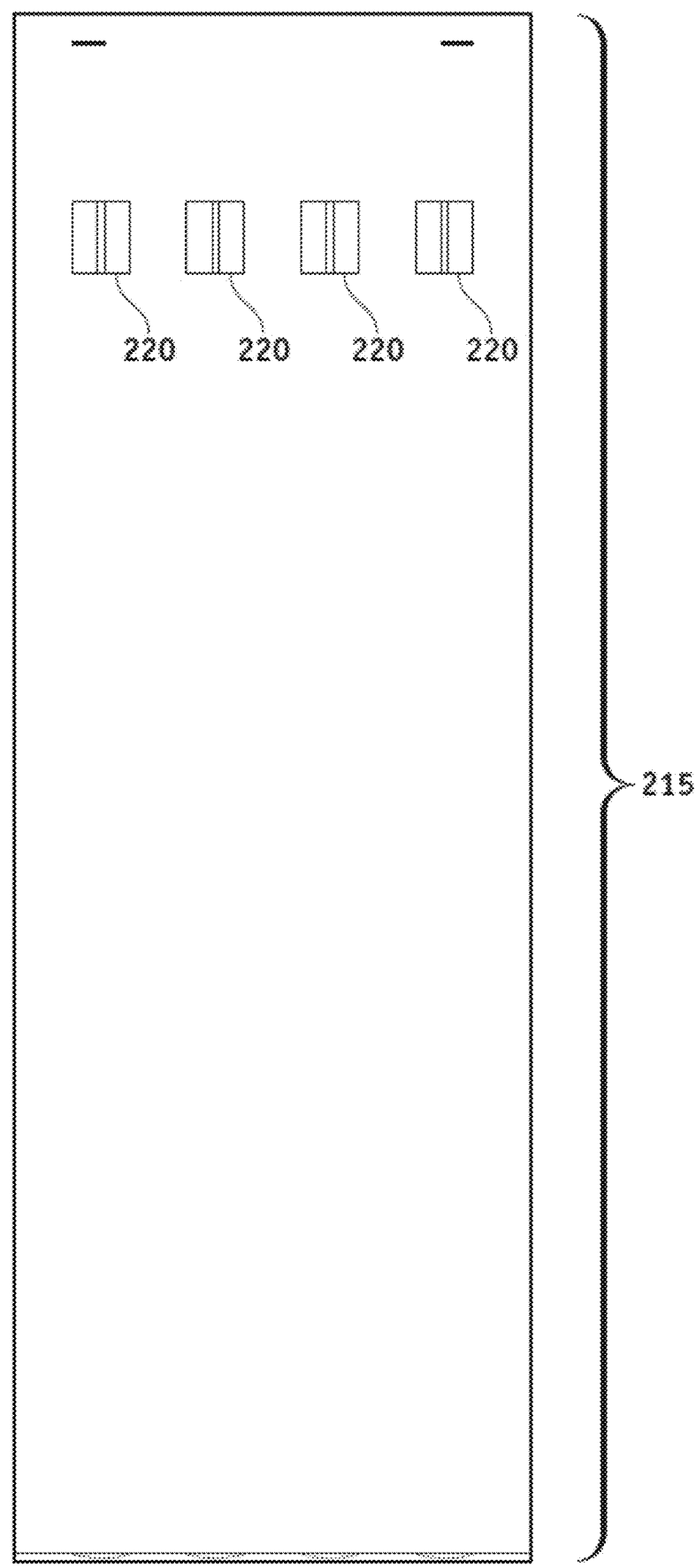
FIG. 4 illustrates a portion of the inventive apparatus, in accordance with an embodiment of the invention.

FIG. 4 illustrates an exemplary resting pad 215 from a front view, in accordance with one embodiment of the invention. The resting pad 215 comprises a barrel support pad 220, a support plank 225 (not illustrated in FIG. 4), and a support rod 227 (not illustrated in FIG. 4).

In one embodiment of the invention, the resting pad 215 extends from the support straps 210 to the recoil pad rest at 230. Generally, the resting pad 215 acts as a backing mechanism or a connective mechanism for ensuring that the entire apparatus 100 is connected together to support the weight of any guns that are placed on the apparatus 100.

In one embodiment, the support pad 215 is comprised of flexible material. Exemplary flexible materials include, but are not limited to, cloth materials, plastic materials, composite materials such as tarp, or tent material, or moisture wicking materials. Other flexible materials, that are known to a person of ordinary skill in the art, may also be used without departing from the scope of the invention.

In other embodiments, the support pad 215 is comprised of nonflexible material. Exemplary materials in this embodiment include wood, or other poly carbonate type of materials. Other materials, that are known to a person of ordinary skill in the art, may also be used without departing from the scope of the invention.

In the embodiments wherein nonflexible materials are used, the support pad 215 may be comprised of smaller pieces of nonflexible material that are connected together. Moreover, the smaller pieces may be collapsible to reduce the overall footprint of the support pad 215 for easy storage. For example, the nonflexible material may be comprised of slats that are connected together by a hinge mechanism. Other mechanism for collapsing the material together, as known to a person of ordinary skill in the art, may be used without departing from the scope of the invention. Moreover, other types of smaller pieces, other than slats, may be used, as known to a person of ordinary skill the art, without departing from the scope of the invention.

Barrel Support Pad

Figure 5A:
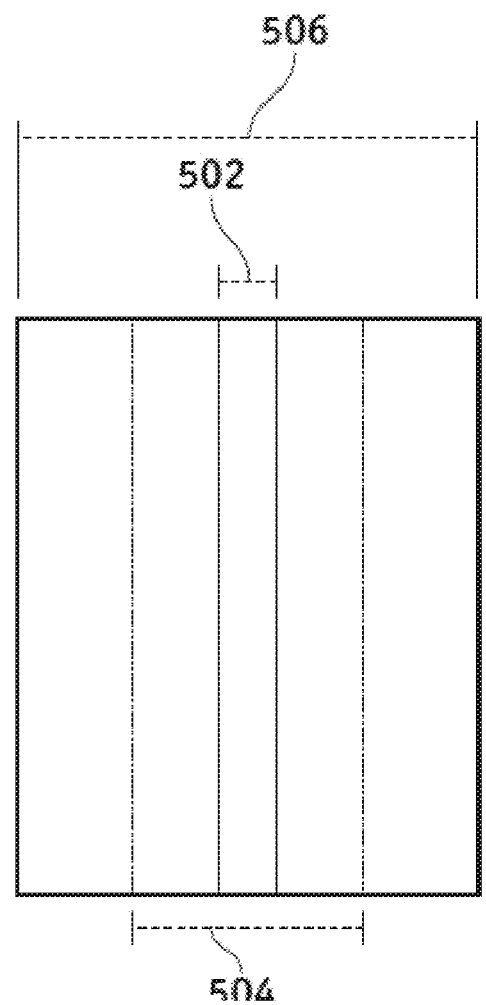
FIG. 5a illustrates a portion of the inventive apparatus, in accordance with an embodiment of the invention.
Figure 5B:
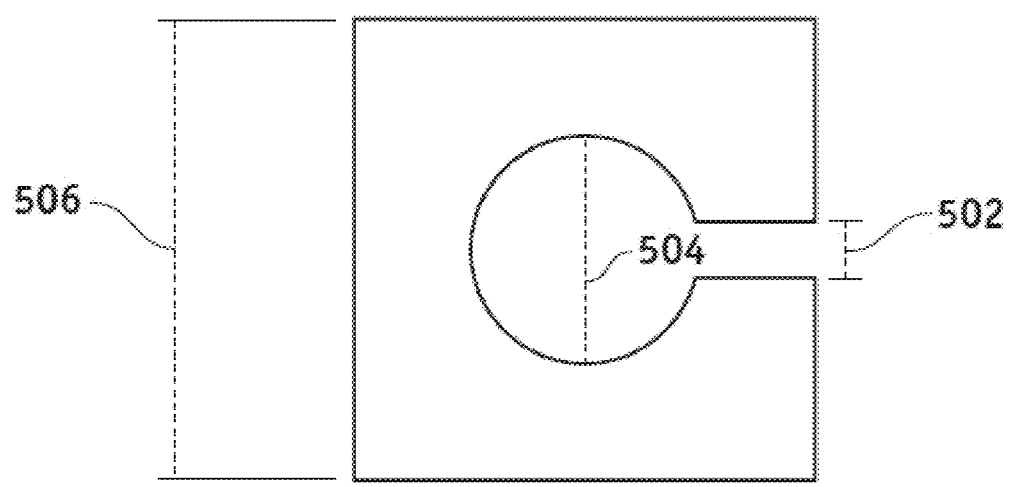
FIG. 5b illustrates a portion of the inventive apparatus, in accordance with an embodiment of the invention.

FIGS. 5a and 5b illustrate an exemplary barrel support pad, in accordance to an embodiment of the invention. The barrel support pads 220 may be connected to the resting pad 215. Although several barrel support pads are illustrated in FIG. 4, the resting pad 215 may include any number of barrel support structures.

The barrel support pad 220 partially encloses gun barrels that are placed on the apparatus 100. In one embodiment of the invention, the barrel support pad 220 includes an interior cavity that is slightly larger in diameter than the barrel of a gun. Moreover, the barrel support pad 220 also includes an opening that is slightly smaller than the outer diameter of the gun barrel. However, the opening of the barrel support pad 220 may be flexible or movable to permit a gun to enter or exit the cavity of the barrel support pad 220 with relative ease. As would be readily understood by a person of ordinary skill in the art, the size of the interior cavity of the barrel support pad 220 may increase or decrease to accommodate different types of guns including rifles of various barrel shapes and diameters and or shotguns with varying barrel sizes. In one embodiment, the barrel support pad 220 may be sewed onto the resting pad 215. But other attachment mechanisms to secure the barrel support pad 220 to the resting pad 215 may be used without departing from the scope of the invention.

FIGS. 5a and 5b illustrate a barrel support pad 220 from a front view and a top view perspective, respectively, according to one exemplary embodiment of the invention. The barrel support pad 220 includes an opening 502, an interior cavity 504, and an external housing 506.

As discussed above, the opening 502 is typically smaller than the outer diameter of the barrel of a gun. However, the opening 502 is modifiable by a user to permit a gun barrel to be inserted into the interior cavity 504. In one embodiment, the opening 502 is bendable and/or expandable to permit a user to enlarge the opening with the application of some force. For example, the opening 502 may be composed of a foam insert that flexibly expands with the application of force, and contracts when no forces applied to it. In other embodiments the opening 502 may be modifiable by, for example and not limited to, a screw and lock mechanism, a latch device, a ring and screw device, or other mechanisms known to a person of ordinary skill in the art. In one embodiment, the opening 502 may be comprised of plastic clips that expand when force is applied to them, and contract when no force is applied to expand the opening.

The interior cavity 504 is typically slightly larger than the exterior diameter of a barrel of gun. The slightly larger cavity 504 ensures that the gun's paint and workmanship are not damaged when the gun is placed on the apparatus 100. In one exemplary embodiment, the interior cavity 504 may be one inch in diameter. But, as would be readily understandable to a person of ordinary skill in the art, the cavities diameter may be changed to accommodate various different types of guns.

The exterior housing 506 represents the outer casing around which the interior cavity 504 and opening 502 are placed. In one embodiment, the exterior housing 506 may be comprised of a foam material which is flexible and or bendable by application of force by a user. In one embodiment, the exterior housing 506 is two inches large, but may be made larger or smaller as would be readily understandable by a person of ordinary skill in the art, without departing from the scope of the invention.

Recoil Rest Pad

FIG. 2 illustrates an exemplary recoil pad rest 230 according to one embodiment of the invention. The recoil pad 230 may include one or more slots/divots/sunken openings. The individual slots or divots may be as large or a small as may be necessary to accommodate the varying sizes of guns. In one exemplary embodiment, the slots are six inches long and three quarters of an inch wide. Moreover, in one exemplary embodiment the divots are the same shape as the end of the recoil pad of a gun. However, other sizes and shapes may be used without departing from the scope of the invention.

The slots of the recoil pad rest 230 may be made out of a foam material that is not abrasive and does not damage the recoil pad on a gun. In other embodiments, other soft and cushioning materials may be used without departing from the scope of the invention. In other embodiments still, hard molded plastic may also be used. Any material that may be used by a person of ordinary skill in the art is claimed herein within the scope of the invention.

One or more slots or divots may be sued within recoil pad rest 230 without departing from the scope of the invention. In one embodiment only one slot may be comprised within the apparatus 100. In other embodiments, more than one slot may be used. If more than one slot is used, a mechanism for collapsing recoil pad rest 230 may be used. The mechanism may include a hinge to enable a user to fold the recoil pad rest 230. But other mechanisms for collapsing the recoil pad rest 230, as may be apparent to a person of ordinary skill in the art, may be used without departing from the scope of the invention.

Additional Features

FIG. 2 illustrates a support plank 225, and a rod support 227. The support plank 225 and rod support 227 may be used when more than one barrel support housing is used. The support plank 225 and rod support 227 may not be necessary when only one or a few barrel support housings are used.

The support plank 225 supports the barrel support pad 220 to ensure that the barrel support pads are adequately attached to the resting pad 215. The support plank 225 may be stitched onto the resting pad 215 and further stitched to the barrel support pad 220. Stitching may be used in one exemplary embodiment but other mechanisms for attaching the support plank 225 to the resting pad 215 and the barrel support pad 220 may be used without departing from the scope of the invention.

The rod support 227 ensures that the resting pad 215 is horizontally aligned. It ensures that the resting pad 215 does not flail or bend unnecessarily when the rod is inserted. Although a rod support 227 is described herein, other mechanisms for straightening out the resting pad 215 may be used as would be readily understood by a person of ordinary skill in the art.

In one embodiment, the rod support 227 may be placed in a cavity within the resting pad. The cavity and the rod may extend through the majority of the horizontal surface of the resting pad 215. Although the rod support 227 is illustrated as being near the top of the resting pad 215, it may be placed anywhere throughout the vertical surface of the resting pad 250.

Referring back to FIG. 2, which illustrates one exemplary embodiment of the support strap 210. The support strap 210 may be made out of nylon or other webbing type of material in one exemplary embodiment. But other materials may be used, as may be readily known to a person of ordinary skill in the art, without departing from the scope of the invention.

The support strap 210 attaches to the attachment to mechanism 205 on one end, and to a resting pad 215 on the other end. The support strap includes two connection means. A first connection means attaches to the "G" clip, and a second connection mean attaches to the resting pad 215. Moreover, the support strap 210 includes an adjustment mechanism that permits a user to adjust the length of the support strap 210.

In one embodiment, the connection meas are comprised of simple straps with oversized ends that slot into corresponding slots in the adjustment mechanism 205 and the resting pad 215. The oversized ends may be collapsible to go inside the corresponding slots but extend so that they don't accidentally fallout of the slot. In one embodiment, the attachment mechanisms are similar to those found in common backpacks. However, the invention is not limited to this particular attachment mechanism. Any attachment mechanism that may be used by a person of ordinary skill in the art may be used without departing from the scope of the invention so long as the attachment mechanism locks in and prevents accidental decoupling.

The support strap 210 also includes a length adjustment system, which permits a user to adjust the length of the support strap 210. In one embodiment of the invention, the length adjustment system is comprised of a strap adjuster similar to one seen in common backpacks. The support strap 210 loops around the strap adjuster so that a user can adjust the length of the strap as desired. It should be noted, however, that the strap adjuster is simply one exemplary embodiment for the adjustment mechanism, and the invention is not limited to just the strap adjuster. Any adjustment mechanism that may be used by a person of ordinary skill in the art may be used without departing from the scope of the invention.

Multiple support straps may be used and the number may vary on the width of the resting pad that may be used. If additional support straps are used they may slot into an additional attachment mechanism 205 and an additional slot on the resting pad 215. Additional attachment mechanisms 205 and additional slots on the resting pad 215 may be used without departing from the scope of the invention.

FIG. 2 illustrates a safety stake 240 that may be used to secure the apparatus 100 to the ground. The stake 240 ensures that the apparatus 100 is secured against the ground, and to ensure that it does not move in the wind or get knocked over.

The safety stake 240 may be a simple nail that goes through some portion of the apparatus 100 and into some portion of the ground above which the apparatus 100 is placed. In one embodiment, the safety stake goes through a hole on the recoil pad rest 230. However, the safety stake may go through other portions of the apparatus 100. Moreover, other methods of securing the apparatus 100, that are known to a person of ordinary skill in the art, may also be used without departing from the scope of the invention.

A feature of the invention is the apparatus 100, by virtue of being comprised of a fabric and/or flexible resting pad 215 may be rolled up for easy carrying and stowing. In one embodiment of the invention, the apparatus may include carry handles disposed on the exterior of the apparatus, which may be used to carry the apparatus 100 when the apparatus 100 is rolled-up.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for temporarily storing a gun in a field environment for quick insertion and removal, the apparatus comprising:
   an attachment mechanism for attaching the apparatus to an exterior portion of a vehicle;
   a barrel support pad having a length and a width, the barrel support pad comprising a singular opening that extends the entire length of the barrel support pad, and an interior cavity for securing the barrel of the gun, wherein the interior cavity of the barrel support pad is wider in diameter than the exterior diameter of a barrel of the gun and the opening is narrower than the exterior diameter of the gun barrel, the barrel support pad further being flexible wherein the singular opening may be expanded by the application of the pressure, and wherein the singular opening is configured to be narrower than the exterior diameter of the gun barrel when no pressure is applied;
   a recoil pad rest comprising at least one divot for receiving the recoil pad of the gun, the recoil pad rest and the barrel support pad securing the gun in substantially vertical orientation such that the recoil pad rest is below the barrel of the gun when the gun is secured within the apparatus; and
   a resting pad connecting the recoil pad rest to the barrel support pad, wherein the resting pad is made of a fabric-type material and is configured to be rolled up for carrying and stowing.

2. The apparatus of claim 1 further comprising a support strap for connecting the attachment mechanism to the resting pad.

3. The apparatus of claim 2, wherein the support strap is comprised of a flexible fabric-type material that can be rolled or folded by a user.

4. The apparatus of claim 1, further comprising a safety stake for securing the apparatus to a ground surface.

5. The apparatus of claim 1, wherein the attachment mechanism is comprised of a G-clip.

6. The apparatus of claim 5, wherein the G-clip is comprised of a hook, a vertical brace, and a horizontal brace, wherein the hook lodges over and around a ledge on a vehicle's exterior surface.

7. The apparatus of claim 6, wherein the vehicle is a pick-up truck.

8. The apparatus of claim 7, wherein the G-clip attaches to a portion of a sidewall surrounding the pick-up truck's truck bed.

9. The apparatus of claim 6, wherein the barrel support pad is comprised of a foam-type material.

10. The apparatus of claim 9, wherein the barrel support pad's opening is expanded by thrusting the barrel of the gun towards the interior cavity of barrel support pad when the barrel of the gun is exterior to the barrel support pad.

11. The apparatus of claim 9, wherein the barrel support pad's opening is expanded by thrusting the barrel of the gun towards the barrel support pad's opening when the barrel of the gun is inside the barrel support pad.

12. The apparatus of claim 9, wherein the opening of the barrel support pad prevents the barrel of the gun from entering or exiting the interior cavity unless pressure is applied to force the gun through the barrel support pad's opening.

13. An apparatus for temporarily storing a gun in a field environment for quick insertion and removal, the apparatus comprising:
   an attachment mechanism for attaching the apparatus to a vertically upright structure;
   a barrel support pad having a length and a width, the barrel support pad comprising a singular opening that extends an entire length of the barrel support pad, and an interior cavity for securing the gun, wherein the interior cavity of the barrel support pad is wider in diameter than the exterior diameter of a barrel of the gun and the singular opening is narrower than the exterior diameter of the gun barrel, the barrel support pad further being flexible wherein the singular opening may be expanded by the application of the pressure, and wherein the singular opening is configured to be narrower than the exterior diameter of the gun barrel when no pressure is applied;
   a recoil pad rest comprising at least one divot for receiving the recoil pad of the gun, the recoil pad rest and the barrel support pad securing the gun in substantially vertical orientation such that the recoil pad rest is below the barrel of the gun when the gun is secured within the apparatus; and
   a resting pad connecting the recoil pad rest to the barrel support pad, wherein the resting pad is made of a fabric-type material and is configured to be rolled up for carrying and stowing.

14. The apparatus of claim 13, wherein the vertical structure is an exterior vertical surface of a vehicle.

15. The apparatus of claim 1, the apparatus further comprising:
   one or more additional attachment mechanisms for attaching the apparatus to the exterior portion of the vehicle;
   one or more additional barrel support pads, wherein each barrel support pad has a length and a width, each barrel support pad comprising a singular opening that extends the entire length of the one or more additional barrel support pads, the one or more additional barrel support pads each having an interior cavity for securing a barrel of the gun, wherein the interior cavity of the one or more additional barrel support pads are wider in diameter than the exterior diameter of the gun barrel and the singular opening is narrower than the exterior diameter of the gun barrel, the one or more additional barrel support pads further being flexible wherein the singular opening may be expanded by the application of the pressure, and wherein the singular opening is configured to be narrower than the exterior diameter of the gun when no pressure is applied;
   one or more additional recoil pad rests comprising at least one divot for receiving the recoil pad of the gun, the one or more additional recoil pad rests and the one or more additional barrel support pads securing the gun in a substantially vertical orientation such that the one or more additional recoil pad rests are below the barrel of the gun when the gun is secured within the apparatus; and
   one or more additional resting pads connecting the one or more recoil pad rests to the one or more additional barrel support pads, wherein the one or more additional resting pads are comprised of a fabric-type material.

* * * * *